Feb. 17, 1953 D. D. ROBERTSON 2,629,020

COORDINATE SELECTING AND LOCK-OUT CIRCUIT FOR INTERPOLATED SPEECH TRANSMISSION

Filed Dec. 19, 1950 2 SHEETS—SHEET 1

INVENTOR
D. D. ROBERTSON
BY H. A. Burgess
ATTORNEY

Feb. 17, 1953 D. D. ROBERTSON 2,629,020

COORDINATE SELECTING AND LOCK-OUT CIRCUIT FOR INTERPOLATED SPEECH TRANSMISSION

Filed Dec. 19, 1950 2 SHEETS—SHEET 2

INVENTOR
D. D. ROBERTSON
BY H. A. Burgess
ATTORNEY

Patented Feb. 17, 1953 2,629,020

UNITED STATES PATENT OFFICE 2,629,020

COORDINATE SELECTING AND LOCK-OUT CIRCUIT FOR INTERPOLATED SPEECH TRANSMISSION

Donald D. Robertson, Morristown, N. J., assignor to Bell Telephone Laboratories, Incorporated, New York, N. Y., a corporation of New York Application December 19, 1950, Serial No. 201,563

1 Claim. (Cl. 179—18)

The present invention relates to interpolated speech transmission in which speech is transmitted in short fragments over available toll circuits with fragments from different talkers intermingled on the same circuits to make maximum use of the circuits by minimizing periods of no transmission during pauses between words or syllables of any one talker.

A system of this general type is disclosed in detail in a copending application of A. C. Dickieson, P. G. Edwards, D. D. Robertson and A. V. Wurmser, Serial No. 201,586 filed December 19, 1950 to which reference may be made for the details of the entire system. The present invention is concerned with the transmitting end of such a system and particularly with the problem of effecting connections between calling lines and outgoing trunks or channels under control of speech fragments to be sent.

It is an object of this invention to effect such connections in a minimum of time and in a positive manner.

A further object is to insure against double selection of the trunk or channel in a speech interpolation or similar system.

In a speech interpolation system in accordance with this invention, all talkers up to the capacity that has been determined for the system have equal access to all toll circuits not in use and any toll circuit becomes immediately available for seizure by any other subscriber as soon as it is released by the previous talker. The invention obviates the necessity of such prior proposed expedients as assigning a given toll circuit to each talker in a given sequence or in a preferential order, or employing at opposite ends of the trunk circuit subscriber-identifying devices operating in sequential order or dependent upon synchronous control or accurately timed relationship.

While the present invention is concerned only with the manner of effecting connections between subscriber lines and outgoing trunks or circuits at a transmitting terminal, it is of course necessary to coordinate such connections with similar connections at the distant terminal. Provision for accomplishing this form no part of the present invention but any suitable coordinating system may be used such as that disclosed in the aforementioned Dickieson et al. application and claimed in copending application of P. G. Edwards and A. V. Wurmser Serial No. 201,632 filed December 6, 1950, in which channel-identifying tones and subscriber-identifying tones are sent over the system to the distant terminal for use in making the necessary selections of subscriber lines at that terminal.

Figure 1:
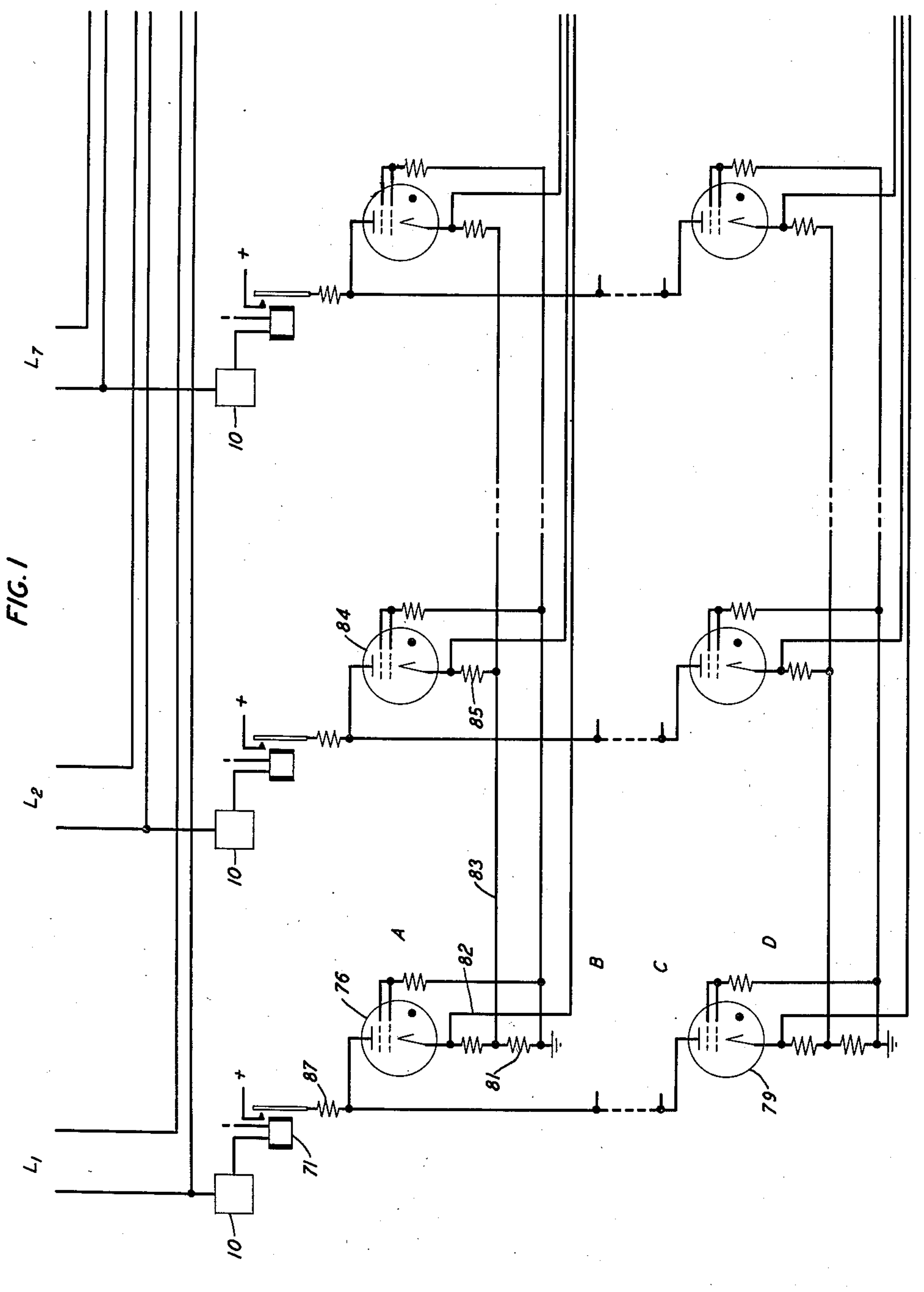
Figure 2:
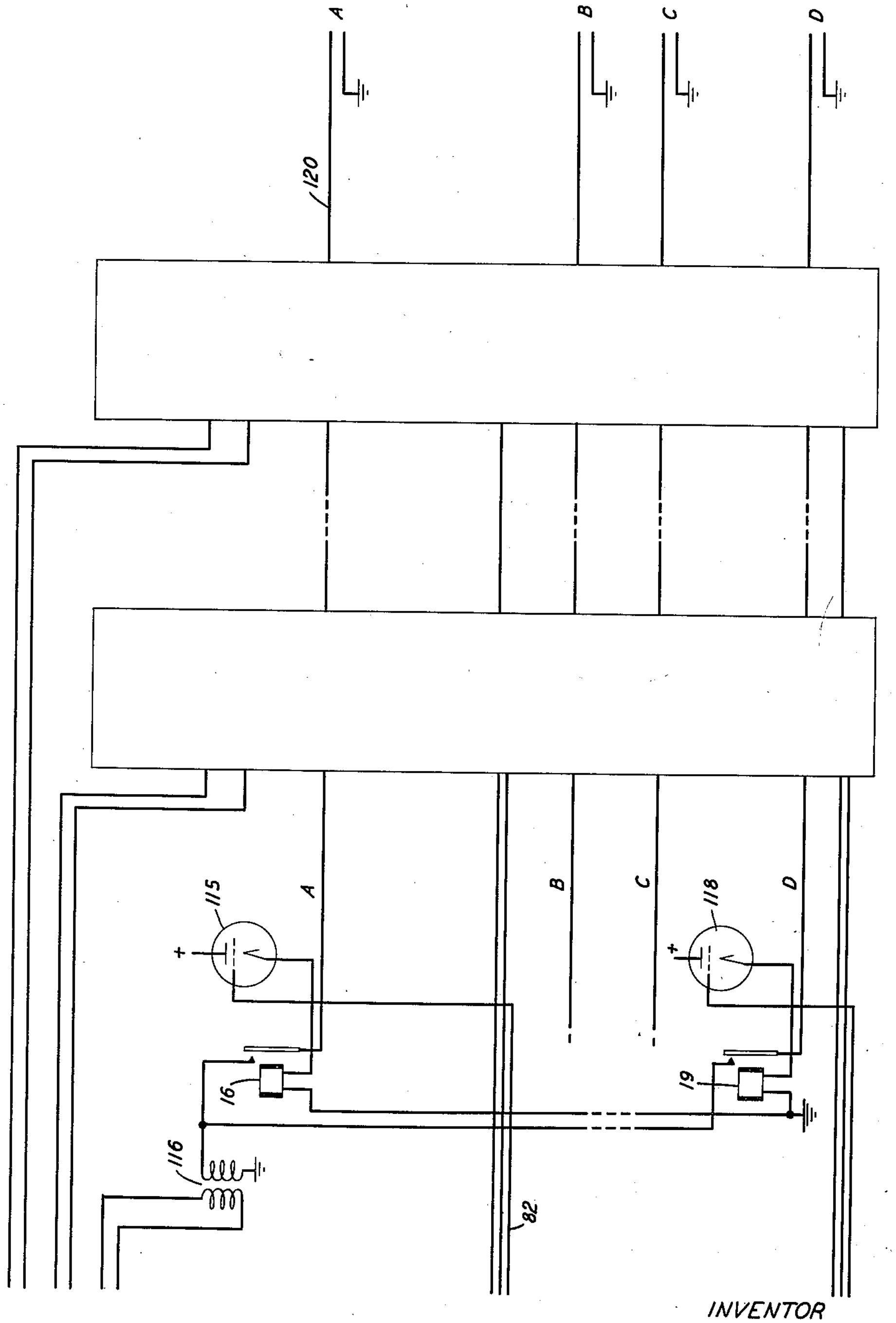

The invention will be more fully understood from the following detailed description when read in connection with the accompanying drawings comprising Figs. 1 and 2, which when placed together and Fig. 1 at the left is a schematic diagram of so much of a transmitting terminal as is necessary for an understanding of the present invention.

The present disclosure similarly to those of the two applications above referred to presupposes a group of subscriber lines, seven in number, indicated at $L_1$ to $L_7$ of Fig. 1 and by way of illustration, four trunk circuits or channels A, B, C and D, leading to the distant station. Whenever a speech spurt is received over one of the subscriber lines $L_1$, etc. connection of that line is made to one of the available trunk circuits A, B, C or D so that the speech spurt is transmitted into the connected trunk circuit. At the conclusion of the speech fragment the circuit is released and made available for selection by another subscriber. The invention provides lock-out circuits for preventing seizure of the same trunk or channel by more than one subscriber line at the same time.

Each subscriber line is equipped with an amplifier detector circuit 10 for converting speech currents into currents suitable for operating relays such as relay 71. The circuit 10 may be part of a vodas circuit, it being assumed that each line $L_1$ etc. also has a receiving branch separate from the transmitting branch shown on Fig. 1.

The circuit of Fig. 1 comprises twenty-eight gas-filled tubes arranged in four rows of seven tubes each, or looked at another way, in seven columns of four tubes each. Each row is individual to a trunk or channel A, B, C or D, and each column is individual to a line $L_1$ etc. The four tubes individual to the line $L_1$ are for example 76, 77, 78 and 79, of which 76 and 79 are shown. All of the tubes are normally deenergized since their plate current supply is cut off unless the corresponding relay 71 is energized.

The actual talking connections between the lines $L_1$ to $L_7$ and the trunks A, B, C, D are made by the circuits shown on Fig. 2. This figure comprises twenty-eight vacuum tubes, two of which are shown at 115 and 118, arranged in columns and rows similar to the tubes of Fig. 1. Each of the tubes on Fig. 2 has its grid controlled from the corresponding gas-filled tube of Fig. 1, and in turn controls actuation of a corresponding relay such as 16, which when energized connects the secondary of the corresponding speech repeating coil 116 to the corresponding channel.

When any speech actuated relay associated with one of the lines $L_1$ etc. such as relay 71, for example, is energized by a speech fragment, it applies plate voltage to the corresponding column of gas tubes 76 to 79 for example, causing one of these tubes to ionize. When a tube such as tube 76 fires, current is drawn through cathode resistor 81 raising the potential of conductors 82 and 83. Lead 83 forms part of the cathode to ground connection of each of the other tubes 84, etc. of the A row. Each tube in a row has its own individual cathode resistor 85. The firing of any gas tube in row A including tubes 76, 84, etc., raises the potential of the cathodes of all the other tubes in the row sufficiently to prevent them from firing in reponse to a voice spurt on any other subscriber line. Lead 82 applies positive voltage to the grid of tube 115 (Fig. 2) at the cross point between line $L_1$ and channel A of Fig. 2. This results in actuation of relay 16 which extends the voice spurt coming from the transmitting branch of line $L_1$ through speech transformer 116 to the channel A conductor 120.

If all four channel selecting circuits of Fig. 1 are idle when a speech spurt occurs on any line, the channel that is selected depends upon which one of the four tubes 76, 77, 78 or 79 (in the column belonging to the line) fires first. One and only one of the tubes will fire and in firing will drop the plate voltage of the others below the ignition level by current flow through the common plate resistor 87. At the end of the speech spurt relay 71 releases and restores all the tubes 76 to 79 in the column belonging to the line to their deenergized condition so that they may be selected again. Provision may be made for a holdover period of one-hundredth second. It will thus be seen that if for example, a speech spurt on line $L_1$ resulted in ionizing tube 79 and therefore selecting channel D, a speech spurt on another line such as $L_2$ during the period of transmission of the fragment on line $L_1$ would have to select another one of the available channels such as A, B or C and might for example, select channel A, if idle, by causing ionization of tube 84.

The invention is not to be construed as limited to the details which are disclosed herein since modifications may be made within the spirit and scope of the invention.

What is claimed is:

In an interpolated speech transmission system, subscriber lines, a lesser number of trunk circuits, a voice-operated switch per subscriber line, a plurality of gas-filled discharge devices arranged in a coordinate array of vertical columns and horizontal rows, there being one column per line and one row per trunk circuit, a single one of said discharge devices being positioned at each cross-point and comprising at least an anode electrode and a cathode electrode, means controlled by the switch of any line for supplying anode voltage to the anode electrodes of all discharge devices in the respective column for the duration of a speech spurt received over the respective subscriber line, the anode-cathode circuit of each device in the same vertical column containing a common anode load resistor, the anode-cathode circuit of each device in the same row including a common cathode load resistor and in series therewith an individual cathode resistor, a plurality of grid-controlled discharge tubes equal in number to and individual to said discharge devices, a relay individual to and operated by each tube for extending a talking connection between an individual line and an appropriated trunk circuit, and an actuating circuit for each tube comprising a connection from the grid of such tube to the cathode of the corresponding discharge device.

DONALD D. ROBERTSON.

REFERENCES CITED

The following references are of record in the file of this patent:

UNITED STATES PATENTS

| Number | Name | Date |
|---|---|---|
| 2,023,589 | Hersey | Dec. 10, 1935 |
| 2,291,752 | Parker | Aug. 4, 1942 |
| 2,434,989 | Christian | Jan. 27, 1948 |
| 2,532,718 | Hecht | Dec. 5, 1950 |